April 25, 1961
E. C. BETTONI
2,981,194
COMBINATION DISTRIBUTOR AND SELECTIVELY
OPERATED VACUUM OR LIKE PUMP
Filed Aug. 12, 1957
2 Sheets-Sheet 2
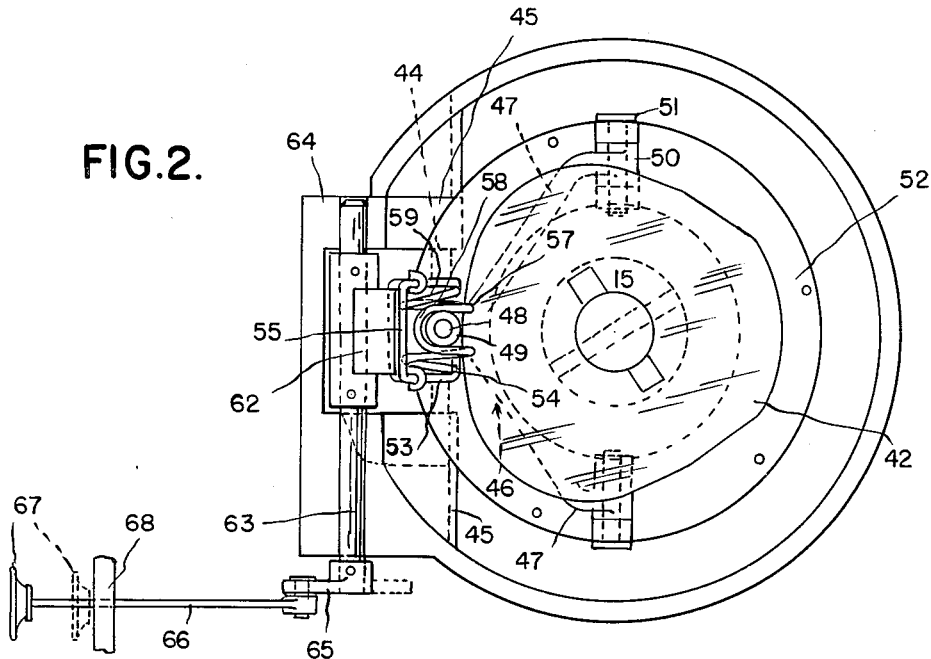
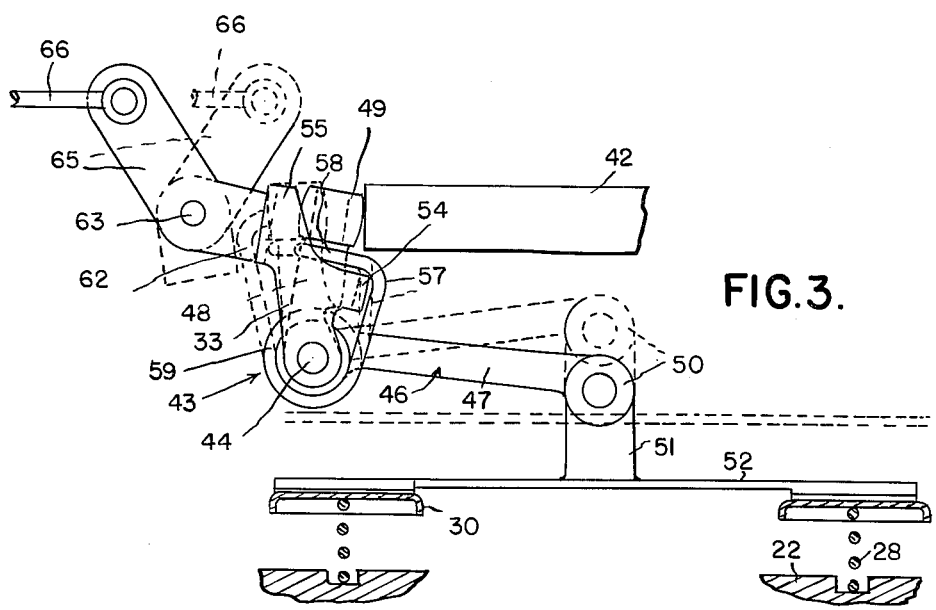
INVENTOR.
EUGENE C. BETTONI
BY Whittemore, Hulbert &
Belknap
ATTORNEYS 2,981,194
Patented Apr. 25, 1961

2,981,194

COMBINATION DISTRIBUTOR AND SELECTIVELY OPERATED VACUUM OR LIKE PUMP

Eugene C. Bettoni, Birmingham, Mich., assignor to Holley Carburetor Company, Van Dyke, Mich., a corporation of Michigan Filed Aug. 12, 1957, Ser. No. 677,719

5 Claims. (Cl. 103—23)

The present invention relates to an improved combination with an electrical ignition distributor for an automotive engine of a fluid pump which is selectively controllable manually by the driver to place the pump in or out of operation as required.

More particularly, the pump component of the combination may be used as the vacuum pump of a vacuum advance mechanism capable of being selectively brought into operation to augment engine manifold vacuum, or, if desired, as an operator for the motor of a windshield wiper or the like, thus affording a source of fluid medium of substantially constant value.

In the alternative, the pump unit may be employed as an auxiliary to pump fuel or any other fluid, gas or liquid, positively for any desired purpose, always under the ready control of the operator of the automotive vehicle.

A general object is to provide a combination of the sort described, as well as the pump component thereof, in which the pump is optionally controlled by the operator to place it is operation or in idle and thereby has the advantage that additional vacuum or pumping pressure is available from the pump when required, yet the latter constitutes no drain on engine power when such vacuum or pressure is not needed.

It is a further object of the invention to provide a pump unit of the sort referred to above which is extremely compact and quite inexpensive in its parts, being constructed for use as an adapter unit applicable to the conventional electrical distributor to considerably expand the function of the latter.

Other objects and features of the invention will become apparent as the description proceeds, especially when taken in conjunction with the accompanying drawings illustrating preferred embodiments of the invention, wherein:

Fig. 2 is a view in horizontal section along line 2—2 of Fig. 1; and

Fig. 3 is a somewhat schematic view in side elevation of the operating linkage for the improved auxiliary pump unit of the invention, operative engaged and inoperative disengaged positions of parts thereof indicated in solid and dotted lines, respectively.

Figure 1:
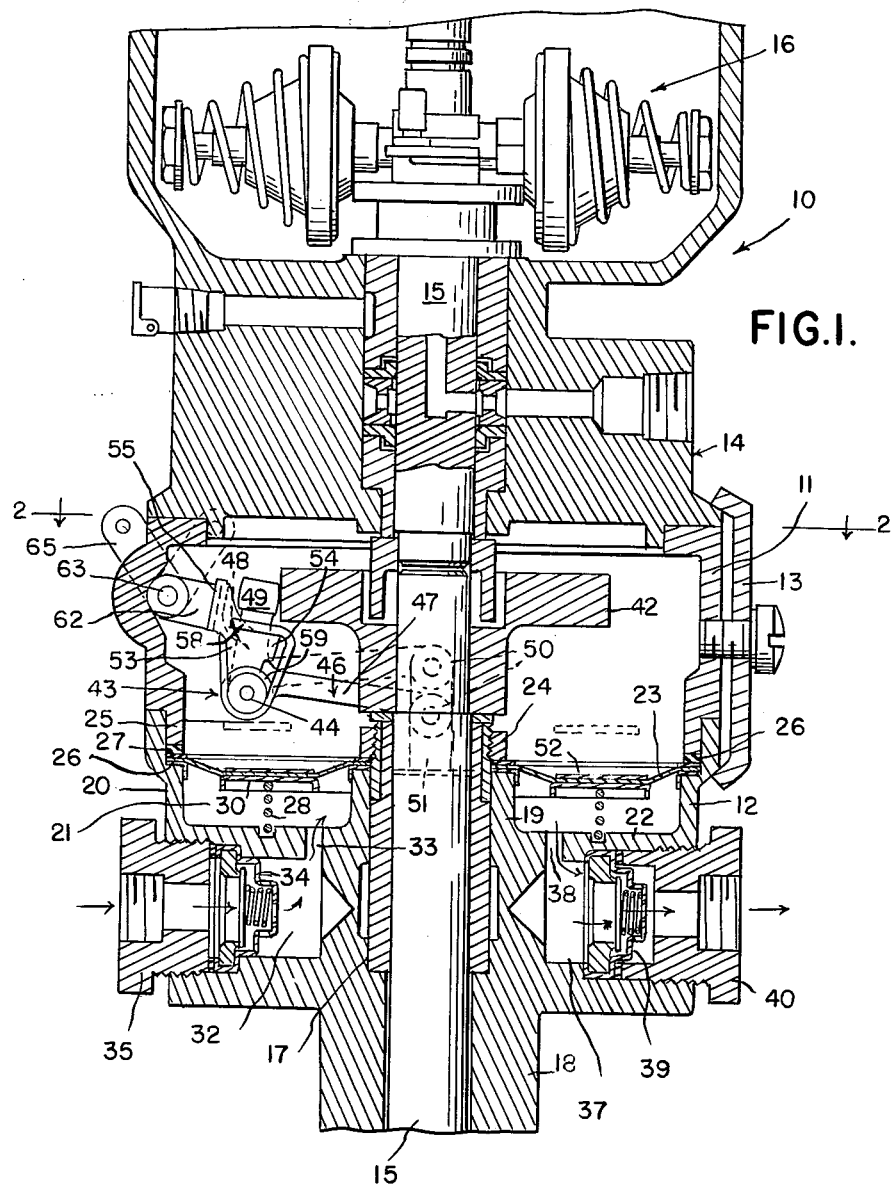
Fig. 1 is a fragmentary view in vertical axial section through a combined distributor-pump installation in accordance with the invention, with the inoperative or disengaged position of certain of the parts being indicated in dotted line.

Referring first to Figure 1 of the drawings, the reference numeral 10 generally designates a pumping unit of the improved combination, which is constituted by parts (hereinafter described in detail) mounted within an upper annular cam and linkage housing 11 and a lower pump and valve housing 12. These housings are assembled together in a nested relation, in which they are held by a suitable releasable clamp ring 13.

This clamp also mounts the unit 10 to the housing structure 14 of a conventional automotive ignition distributor, features of which constitute no part of the invention and need only be indicated to include a vertical distributor drive shaft 15, operated by the engine in a known way, and centrifugal speed responsive spark adjusting means 16. The drive shaft 15 is appropriately journaled for rotation within the housing 14, a suitable bearing 17 within the pump and valve housing 12 assisting in this end.

The housing 12 includes a fixed central hub 18 which is adapted to be suitably mounted on the engine block, this hub having an annular central upper extension 19. An outer annular, upstanding rim or wall 20 of the housing coacts with extension 19 in defining a pumping chamber 21 of annular shape, the body of the housing 18 providing the floor 22 of this chamber.

A suitable flexible pump diaphragm 23 completes the chamber 21. This diaphragm is centrally clamped in sealed condition against the hub extension 18 by means of a clamping and sealing nut 24. The outer margin of the diaphragm 23 is similarly clamped between a downwardly extending annular pilot rim 25 on the cam and linkage housing 13 and an internal recessed shoulder 26 of the housing wall 20, with a suitable sealing gasket 27 interposed. It is seen that the pilot rim 25 will nest snugly within the top of the housing wall 20 when housings 11 and 12 are assembled.

An appropriate annular coil compression spring 28 acts between the floor 22 of chamber 21 and an annular backing and wear plate 30 applied to the diaphragm 23, urging the latter upwardly under force uniformly applied in the circumferential sense.

The housing 12 is formed beneath the pumping chamber 21 to provide an intake valve chamber 32 communicating with one side of chamber 21 through a passage 33 in the floor 22. A conventional caged disc type, one-way valve 34 is fitted to the chamber 32, being held in place by an apertured sealing plug 35 threaded in a side opening of housing 12. This plug is connected through suitable conduitry or the like (not shown) with the space to be evacuated or whose evacuation is to be augmented, in the case of a vacuum pump installation, or to a source of fuel or other fluid to be pumped, in a positive pumping installation.

Diametrically opposite the intake chamber 32, the valve housing 12 is formed to provide a further exhaust valve chamber 37, which communicates upwardly with the vacuum or diaphragm chamber 21 through a port 38 in the chamber floor. Chamber 37 is equipped with a one-way flow valve disc unit 39 similar to the intake valve unit 34. It is to be noted that the valve units 34 and 39 are disposed whereby an upward suction stroke of the diaphragm 23 will cause the former to open and admit fluid to intake chamber 32, the unit 39 being pressurized to seal it; and that upon a downward pumping stroke of the diaphragm the unit 34 seals and the unit 39 unseats and opens to discharge fluid, flow being in the direction indicated by arrows in Figure 1. An apertured plug 40 holds the exhaust valve unit 39 in place and is adapted to be communicated with atmosphere or with a device to which fluid is to be pumped.

The cam and linkage housing 11 of the unit receives a suitably contoured lobe cam 42, which is fixedly secured to and rotates with the distributor shaft 15. A selectively controlled cam follower and diaphragm operating linkage, generally designated 43, is associated with the cam.

Now referring to Figs. 2 and 3 in conjunction with Fig. 1 for details of the linkage 43, a horizontal rock shaft 44 is mounted within and toward one side of the housing 11, as in bearing bosses 45 formed integrally with the housing. Centrally of its length and between the bosses 45, the shaft 44 has secured thereto a diaphragm operating yoke 46 in the form of a bell crank. The yoke consists of a pair of forked, laterally extending arms 47 and an upstanding cam follower arm 48 at a right angle thereto, on the upper end of which follower arm a cam follower roller 49 is carried.

Each of the yoke arms 47 is provided at its outer extremity with an apertured boss 50, by which it is pivotally connected between apertured lugs 51 secured to an annular diaphragm actuating pressure plate 52. In the operative or engaged position of the linkage 43, the pressure plate is positioned against the diaphragm 23, in opposed relation to the backing plate 30 of the latter as shown in solid line in Figs. 1 and 3. In the inoperative, disengaged condition of the linkage, the pressure plate 52 is elevated to the dotted line position of Figs. 1 and 3.

The linkage 43 further includes an upright pressure bracket 53 in the form of a shaped stamping freely pivoted at its lower end on the horizontal rock shaft 44. Bracket 53 is equipped with an offset lug or finger 54 on its inner side adapted to be positioned in the path of movement of the cam follower arm 48, in a manner to be described, as well as an upper locking nose portion 55 at its outer side and above the lug 54, also for a purpose to be described.

A specially contoured wire pressure spring 57 is associated with the bracket 53 and the cam follower arm 48 of the yoke 46. This spring includes an inner central bight or loop portion 58 which opens radially inwardly and hooks outwardly behind the follower arm 48, one or more coils 59 on either side of the portion 58 which loosely encircle the shaft 44, and a pair of terminal upstanding outer fingers which are outwardly hooked at their ends and engage opposite sides of the nose 55 of the pivoted bracket 53.

When the linkage 43 is in the operative engaged, solid line position shown in Figs. 1 and 3 the bracket 53 backs up or anchors the spring 57 so that its central bight 58 holds the cam follower arm 48 with its follower roller 49 yieldingly engaged with the lobe surface of cam 42.

Bracket 53 is releasably held in this operative position by means of a locking or detent member 62 secured on a rock shaft 63 which parallels the rock shaft 44, being journaled in external boss formations 64 integral with the cam and linkage housing 11. An operating arm 65 is secured externally on the shaft 63, and is controlled by a suitable link or rod 66 leading to a finger piece 67 at the dashboard 68 of the vehicle.

It is seen from the foregoing that when the operating arm 65 and locking or detent member 62 are brought counterlockwise to their operative, engaged position (solid line in Fig. 3), the member 62 engages the locking nose 55 of the pivoted bracket 53, urging the same clockwise against the force of spring 57 and thereby engaging and yieldably holding the cam follower roller 49 for actuation by cam 42. At the same time, the yoke 46, through the pivotal connection of its arms 47 to the pressure plate 52, brings the latter downwardly from the dotted to the solid line position of Figs. 1 and 2.

Upon rotation of cam 42 with the parts thus disposed, the linkage 43 drives the diaphragm 23 in a reciprocating pump stroke, return-assisted by the spring 28. However, when the control arm 65 is swung clockwise to the inoperative, disengaged or released position shown in dotted line in Fig. 2, the locking member 62 releases the pivoted bracket 53, whereupon energy stored in the spring 57 snaps the bracket outwardly or counterclockwise. The follower roll 49 is then not subject to operation by cam 42 and the pressure plate 52 is idle.

The open annular top of housing 11 nestingly receives the bottom of distributor housing 14, completing the compact and snugly assembled housing structure of the combined distributor and pump units. Clamp ring 13 fits over tapered opposed margins of the housings 12 and 14 to wedge and hold the parts firmly in assembly in a vibration-proof way.

It is seen that the invention affords an extremely compact, inexpensive and readily installed adapter unit for association with and drive by a conventional automotive ignition distributor system. Of particular importance, the unit is selectively controllable from the dashboard, so that when its action is not desired or required, the pump, positive or negative pressure type, may be operatively disconnected from the distributor to relieve the engine of load, yet is available by instaneous re-engagement when needed.

The drawings and the foregoing specification constitute a description of the improved combination distributor and selectively operated vacuum or like pump in such full, clear, concise and exact terms as to enable any person skilled in the art to practice the invention, the scope of which is indicated by the appended claims.

What is claimed as my invention is:

1. A pumping unit for use in combination with a rotatively driven electrical distributor unit, comprising an operating cam having means to mount the same for rotation coaxially of the axis of rotation of said distributing unit and means to drivingly connect said operating cam with said distributor unit for rotation in predetermined speed relation thereto, housing means including a pumping diaphragm defining a pumping chamber substantially centered on the axis of rotation of said operating cam, said pumping diaphragm acting in the direction of said last named axis to pump fluid, means operatively connecting said pumping diaphragm and operating cam for driving actuation of the former in response to rotation of the latter, and manually operable means to interrupt and restore said operative driving connection.

2. A pumping unit in accordance with claim 1, in which said means operatively connecting the said operating cam to said diaphragm is a linkage including a pair of members, one of which has an element following said cam, which members are disengageable from and re-engageable with one another in response to operation of said manually operable means.

3. A pumping unit in accordance with claim 1, in which said means operatively connecting the said operating cam to said diaphragm is a linkage including a pair of members, one of which has an element following said cam, which members are disengageable from and re-engageable with one another in response to operation of said manually operable means, said operative connection further comprising a yoke connected to said diaphragm on opposite sides of its center and operatively connected to said one of said members.

4. A pumping unit in accordance with claim 1, in which said operating cam has a cam surface extending about the axis of rotation thereof, said means operatively connecting said pumping diaphragm and cam comprising a follower having means pivotally mounting the same to follow said cam surface and a yoke operatively connected to said diaphragm on opposite sides of the axis of rotation of said cam.

5. A pumping unit in accordance with claim 1, in which said operating cam has a cam surface extending about the axis of rotation thereof and facing radially outwardly thereof, said means operatively connecting said pumping diaphragm and cam comprising a follower having means pivotally mounting the same to follow said cam surface and a yoke operatively connected to said diaphragm on opposite sides of the axis of rotation of said cam.

References Cited in the file of this patent

UNITED STATES PATENTS

| | | |
|---|---|---|
| 1,807,650 | Chryst et al. | Jan. 2, 1931 |
| 2,624,284 | Straub | Jan. 6, 1953 |
| 2,809,868 | Thompson | Oct. 15, 1957 |
| 2,845,033 | Wright | July 29, 1958 |
| 2,856,862 | Korte | Oct. 21, 1958 |
| 2,859,701 | Williams | Nov. 11, 1958 |

FOREIGN PATENTS

| | | |
|---|---|---|
| 752,777 | Great Britain | Nov. 19, 1954 |
| 1,113,572 | France | Dec. 5, 1955 |